United States Patent
Zhang et al.

(10) Patent No.: US 10,541,869 B2
(45) Date of Patent: Jan. 21, 2020

(54) UPGRADING OF CONTROLLER CLUSTER

(71) Applicant: Hewlett Packard Enterprise Development LP, Houston, TX (US)

(72) Inventors: Shengyan Zhang, Beijing (CN); Yixiu Luo, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 121 days.

(21) Appl. No.: 15/502,109

(22) PCT Filed: Aug. 4, 2015

(86) PCT No.: PCT/CN2015/086058
§ 371 (c)(1),
(2) Date: Feb. 6, 2017

(87) PCT Pub. No.: WO2016/019856
PCT Pub. Date: Feb. 11, 2016

(65) Prior Publication Data
US 2017/0230239 A1    Aug. 10, 2017

(30) Foreign Application Priority Data

Aug. 5, 2014    (CN) .......................... 2014 1 0381430

(51) Int. Cl.
*G06F 15/177* (2006.01)
*H04L 12/24* (2006.01)
(Continued)

(52) U.S. Cl.
CPC ........ *H04L 41/082* (2013.01); *H04L 12/6418* (2013.01); *H04L 41/0853* (2013.01);
(Continued)

(58) Field of Classification Search
CPC .......................... H04L 41/082; H04L 41/0859
See application file for complete search history.

(56) References Cited

U.S. PATENT DOCUMENTS

2002/0188934 A1* 12/2002 Griffioen .................. G06F 8/65
717/170
2005/0010915 A1    1/2005 Chen
(Continued)

FOREIGN PATENT DOCUMENTS

CN          1777110 A       5/2006
CN        101217411 A       7/2008
(Continued)

OTHER PUBLICATIONS haihongyuan.com, "H3C Cluster Management Commands," Sep. 24, 2013, pp. 1-39 (online), Retrieved from the Internet on May 9, 2018 at URL: <haihongyuan.com/shengchanjingying/109946.html>.

(Continued)

*Primary Examiner* — Hua Fan
(74) *Attorney, Agent, or Firm* — Hewlett Packard Enterprise Patent Department

(57) ABSTRACT

A method of upgrading controller cluster includes the following steps. A leader controller downloads an upgrade file of a latest version from a version server and executes upgrade in version. The leader controller sends an upgrade announcement message to region controllers and receive upgrade announcement response messages having the same type of product and different current version information from the region controllers. The leader controller records the corresponding region controllers included in the upgrade announcement response messages, sends a download start message to the recorded region controllers, and starts a local file server for the recorded region controllers.

12 Claims, 8 Drawing Sheets

(51) Int. Cl.
*H04L 12/64* (2006.01)
*H04L 29/08* (2006.01)

(52) U.S. Cl.
CPC ...... *H04L 41/0859* (2013.01); *H04L 41/0893* (2013.01); *H04L 67/34* (2013.01)

(56) References Cited

U.S. PATENT DOCUMENTS

| | | |
|---|---|---|
| 2005/0071837 A1 | 3/2005 | Butt et al. |
| 2008/0172478 A1* | 7/2008 | Kiyohara ............... H04L 45/02 709/220 |
| 2014/0013153 A1 | 1/2014 | Chittigala et al. |

FOREIGN PATENT DOCUMENTS

| | | |
|---|---|---|
| CN | 101465757 A | 6/2009 |
| WO | WO201405155 | 4/2014 |

OTHER PUBLICATIONS

International Searching Authority, "Notification of Transmittal of the International Search Report and the Written Opinion", PCT/CN2015/086058, dated Nov. 10 2015, 7 pages.

\* cited by examiner

UPGRADING OF CONTROLLER CLUSTER

BACKGROUND

Overlay networks in the Software Defined Network (SDN) architecture have scaled up along with the constant development of the overlay network technologies, so that a large-scale data center may be configured with a large number of SDN controllers to help ensure stability of the network.

DETAILED DESCRIPTION

In a large-scale data center, the increasing number of SDN controllers can make upgrading the controllers very troublesome and complex. If the SDN controllers are upgraded one by one, the upgrade will be very inefficient; and if all the SDN controllers are upgraded at the same time, there will be a significant burden on a version server in which upgrade files are stored, and a large amount of data may also impact an upstream device and occupy a bandwidth, thus impacting transmission of user data.

This current disclosure provides an example of upgrading the respective controllers in the controller cluster in one batch after another, and therefore: in comparison with upgrading the controllers one after another, the updating efficiency is improved; while in comparison with upgrading all the controllers at the same time, the burden on the version server is significantly lowered, and the occupied bandwidth of the upstream path is decreased.

Figure 1A:
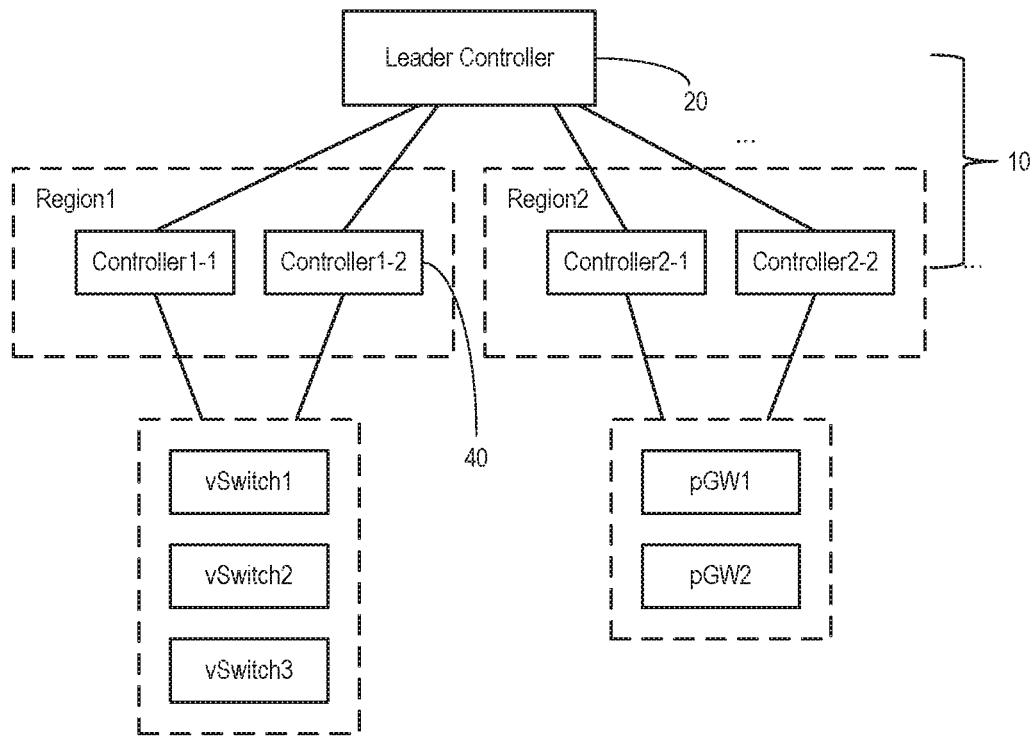
FIG. 1A illustrates a schematic structural diagram of a controller cluster in an example.

Referring to FIG. 1A, there is illustrated a network architecture of a controller cluster in an SDN network in an example of this disclosure.

The controller cluster 10 in the network architecture includes a leader controller 20 and other controllers 40 (i.e., region controllers distinguished from the leader controller). Moreover if there are multiple regions created in the SDN network, then there will be one or more controllers in each of the regions. For example, the controller cluster in FIG. 1A includes a leader controller, and multiple controllers allocated to corresponding regions, for example, the controller 1-1 and the controller 1-2 are allocated to the region 1, the controller 2-1 and the controller 2-2 are allocated to the region 2, etc., and the controllers in the respective regions are connected respectively with virtual switches (vSwitches), Packet Data network Gateways (pGWs), and other controlled devices, for example, the vSwitch 1, the vSwitch 2 and the vSwitch 3 are connected with the controllers in the region 1, and the pGW1 and the pGW2 are connected with the controllers in the region 2.

Figure 1B:
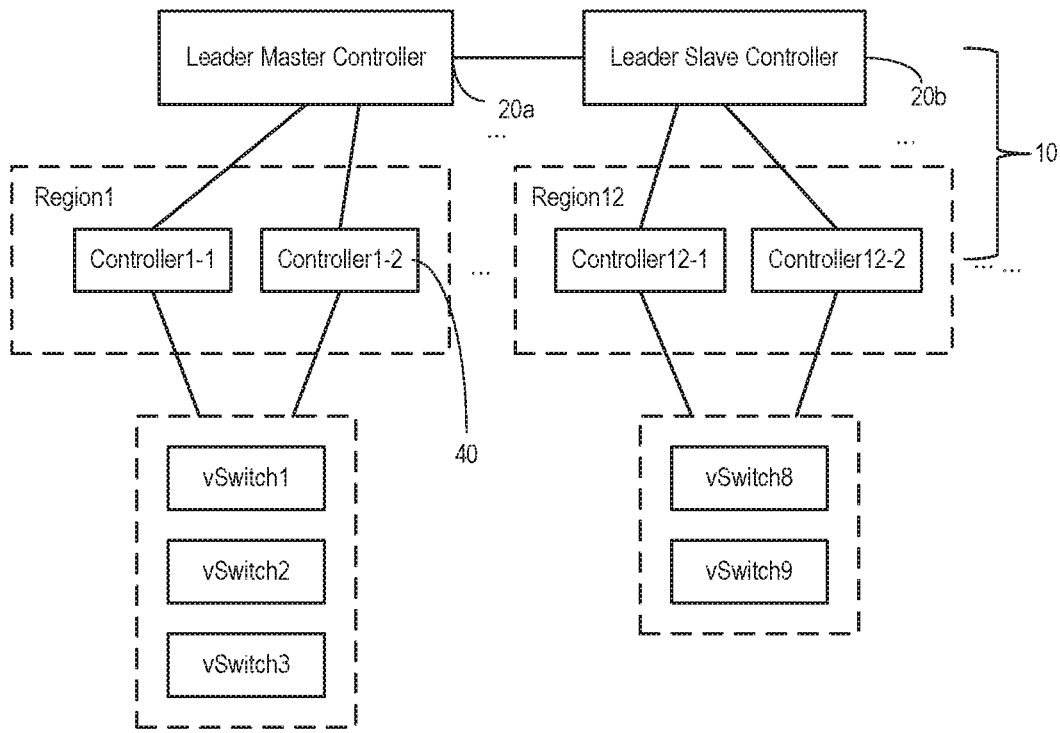
FIG. 1B illustrates a schematic structural diagram of another controller cluster in an example.

Referring to FIG. 1B, there is illustrated a network architecture of another controller cluster in an SDN network in an example of this disclosure, where the network architecture illustrated in FIG. 1B is based upon the network architecture illustrated in FIG. 1A so that the leader controller in the controller cluster in the SDN network can be embodied as primary 20a and backup leader controllers 20b.

If the controller cluster includes a primary leader controller 20a, a backup leader controller 20b, and region controllers 40 allocated to corresponding regions controlled respectively by the primary leader controller 20a and the backup leader controller 20b. For example, the controller 1-1 and the controller 1-2 are allocated to the region 1 controlled and managed by the primary leader controller 20a, the controller 2-1 and the controller 2-2 are allocated to the region 2 controlled and managed by the backup leader controller 20b, etc., and the region controllers 40 in the respective regions are connected respectively with vSwitches and other controlled devices, for example, the vSwitch 1, the vSwitch 2 and the vSwitch 3 are connected with the region controllers 40 in the region 1, and the vSwitch 8 and the VSwitch 9 are connected with the controllers 40 in the region 2.

If the controller cluster 10 is to be upgraded in version (generally, software version), for examples, receives a version upgrade command or satisfies a preset version upgrade condition, then the leader controller 20 and the controllers 40 in the controller cluster will operate for upgrade.

This disclosure provides a method for upgrading a controller cluster which can include a leader controller, and region controllers configured in regions, and the method will be described below respectively from the perspectives of the leader controller and the region controller.

Figure 2:
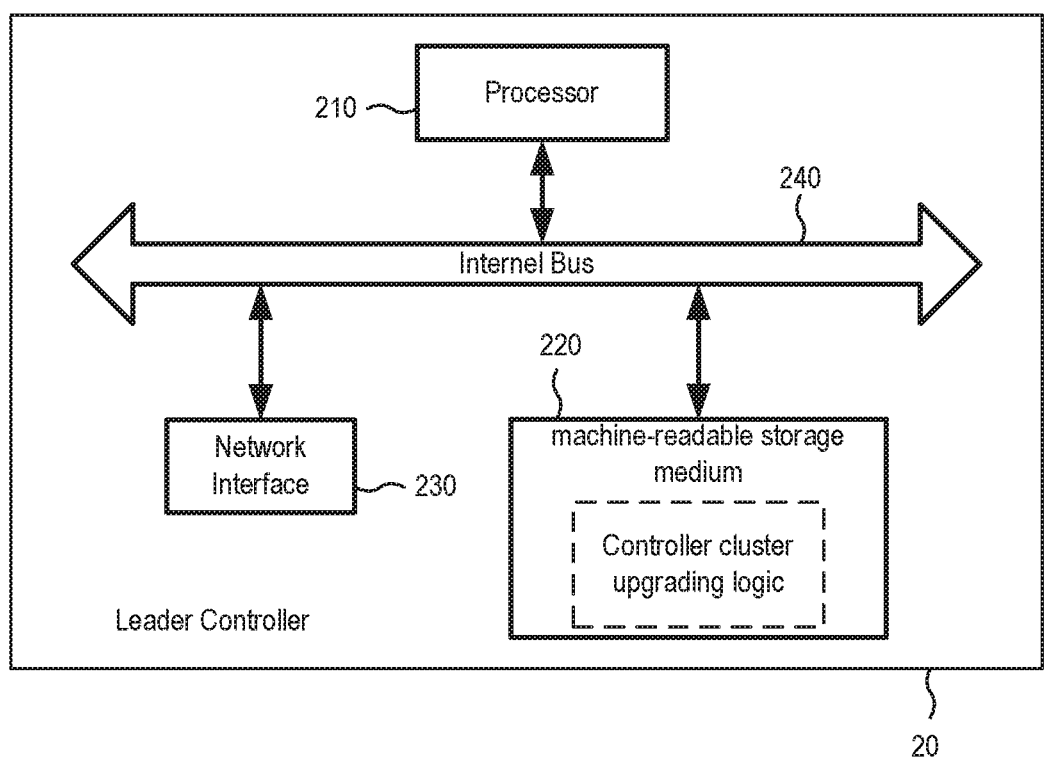
FIG. 2 illustrates a hardware structural diagram of a leader controller in an example.

Referring to FIG. 2, there is illustrated a hardware structure of the leader controller in an example of this disclosure. The leader controller 20 may include a processor 210, a machine-readable storage medium 220, and a network interface 230, all of which are connected with each other by an internal bus 240.

Here the machine-readable storage medium 220 is configured to store instruction codes executed by the CPU 210 to perform an upgrade function of the controller cluster.

The processor 210 communicates with the machine-readable storage medium 220 to read and execute the instruction codes stored in the machine-readable storage medium 220 to thereby perform the upgrade function of the controller cluster.

The machine-readable storage medium 220 can be any electronic, magnetic, optical or another physical storage device, which can include or store information, e.g., executable instructions, data, etc. For example, the machine-readable storage medium 220 can be a Random Access Memory (RAM), a volatile memory, a nonvolatile memory, a flash memory, a storage driver (e.g., a hard disk driver), a solid-state hard disk, any type of storage disk (e.g., an optical disk, a DVD, etc.) or the like, or a combination thereof. Moreover any of the machine-readable storage mediums described in this disclosure can be nonvolatile.

Figure 3:
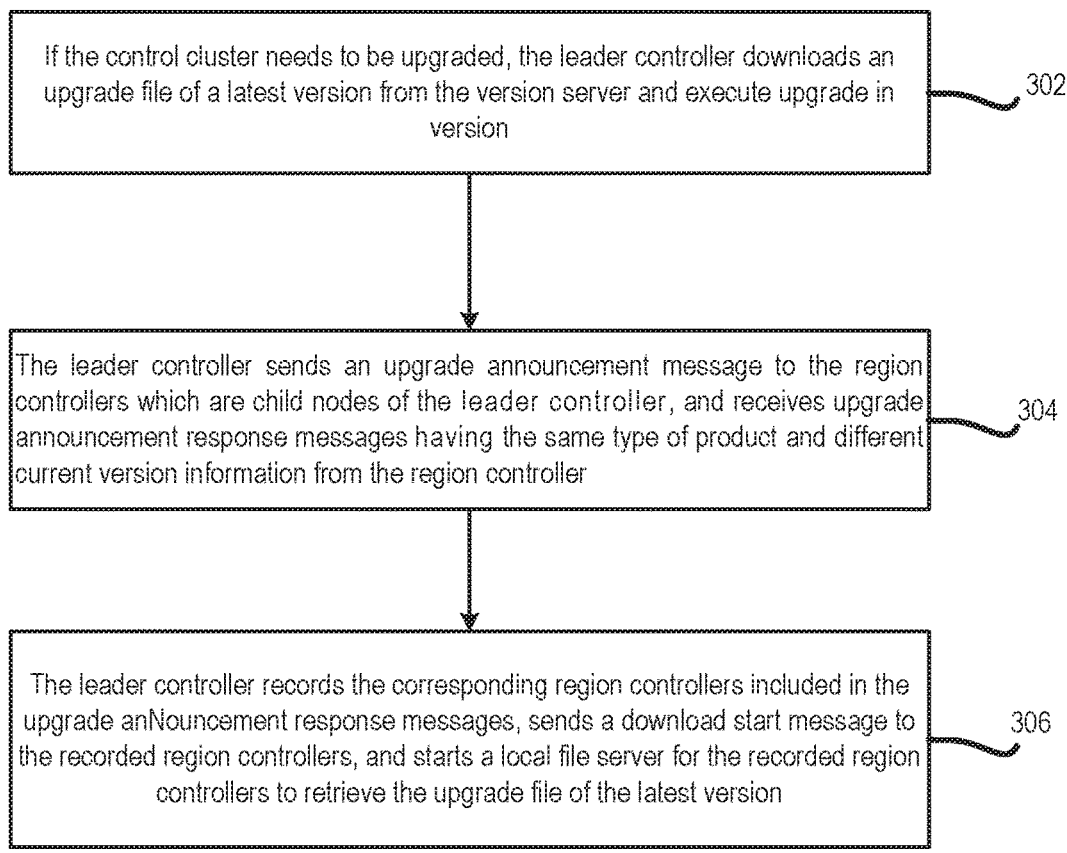
FIG. 3 illustrates a flow chart of a method for upgrading a controller cluster in an example.

Here the processor 210 of the leader controller 20 reads and executes an upgrade logic of the controller cluster in the machine-readable storage medium in an operational flow as illustrated in FIG. 3:

At the block 302, if the control cluster is to be upgraded, then the leader controller downloads an upgrade file of a latest version from the version server, and execute upgrade in version;

In this example, firstly the leader controller 20 downloads the upgrade file of the latest version directly from the version server, and finish its own upgrade. The other region controllers 40 will temporarily neither retrieve an upgrade file nor be upgraded, so that the leader controller 20 can retrieve the upgrade file and be upgraded in version separately from the region controllers 40. In this way, the controller cluster 10 can be upgraded step by step.

At the block 304, the leader controller 20 sends an upgrade announcement message to the region controllers 40 which may be child nodes of the lead controller acting as a present device. The upgrade announcement message includes a type of product, and current version information of the present device. After that, the leader controller 20 may receive upgrade announcement response messages carrying the same type of product and different current version information from the region controllers 40.

In this example, the controller cluster 10 is a tree-like controller cluster structure with the leader controller being a root node. The leader controller 20 sends the upgrade announcement message to the corresponding child nodes (the region controllers) to guide these region controllers 40 being upgraded step by step.

The region controllers 40 may check and feed back the type of product and the current version information, so that the version conditions of the respective region controllers can be known to and controlled by the leader controller 20. In this way, the region controllers 40 can be upgraded in version sequentially.

At the block 306, the leader controller 20 records the corresponding region controllers included in the upgrade announcement response messages, sends a download start message to the recorded region controllers, and starts a local file server for the recorded region controllers to retrieve the upgrade file of the latest version. By 'local' it is meant that the file server is implemented on the leader controller 20.

In this example, the recorded region controllers 40 may not retrieve any upgrade file from the version server but may retrieve the upgrade file from the leader controller 20 at the corresponding root node to thereby alleviate effectively a burden on the version server.

Figure 4:
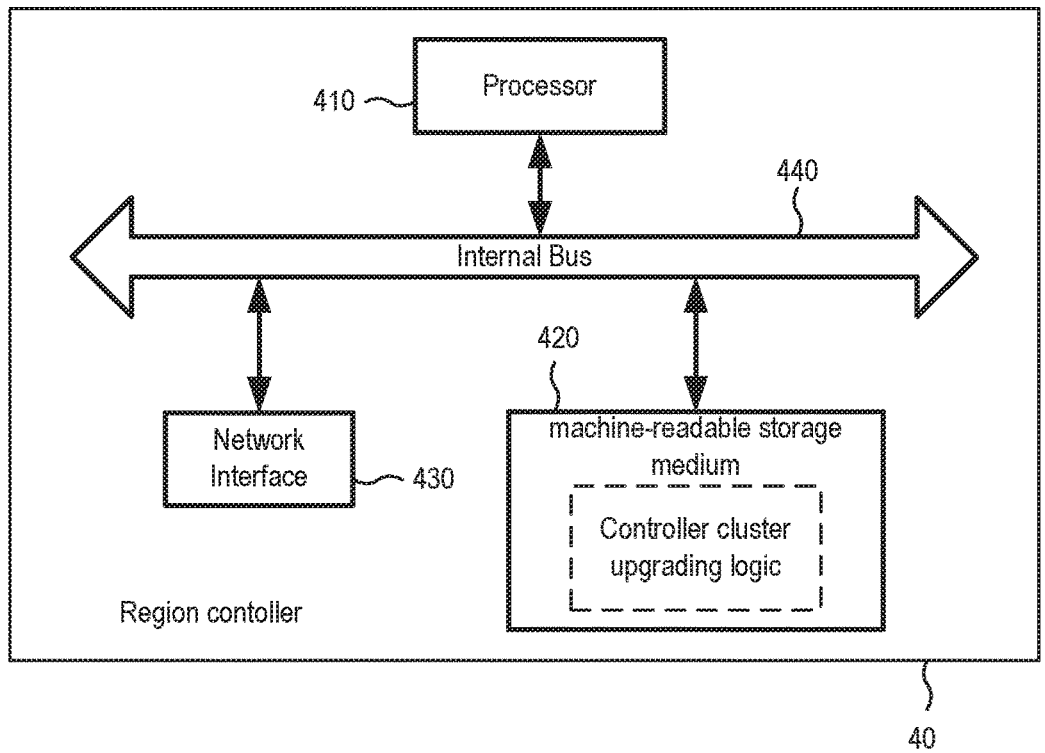
FIG. 4 illustrates a hardware structural diagram of a region controller in an example.

Referring to FIG. 4, there is illustrated a hardware structure of a region controller in an example of this disclosure.

Referring to FIG. 4, the controller 40 may include a processor 410, a machine-readable storage medium 420, and a network interface 430, all of which are connected with each other by an internal bus 440.

The machine-readable storage medium 420 is configured to store machine readable instructions that are to be executed by the processor 410 to perform an upgrade function of the controller cluster 10.

The processor 410 communicates with the machine-readable storage medium 420 to read and execute the machine readable instructions stored in the machine-readable storage medium 420 to thereby perform the upgrade function of the controller cluster 10.

The machine-readable storage medium 420 can be any electronic, magnetic, optical or another physical storage device, which can include or store information, e.g., executable instructions, data, etc. For example, the machine-readable storage medium 220 can be a Random Access Memory (RAM), a volatile memory, a nonvolatile memory, a flash memory, a storage driver (e.g., a hard disk driver), a solid-state hard disk, any type of storage disk (e.g., an optical disk, a DVD, etc.) or the like, or a combination thereof. Moreover any of the machine-readable storage mediums described in this disclosure can be nonvolatile.

Figure 5:
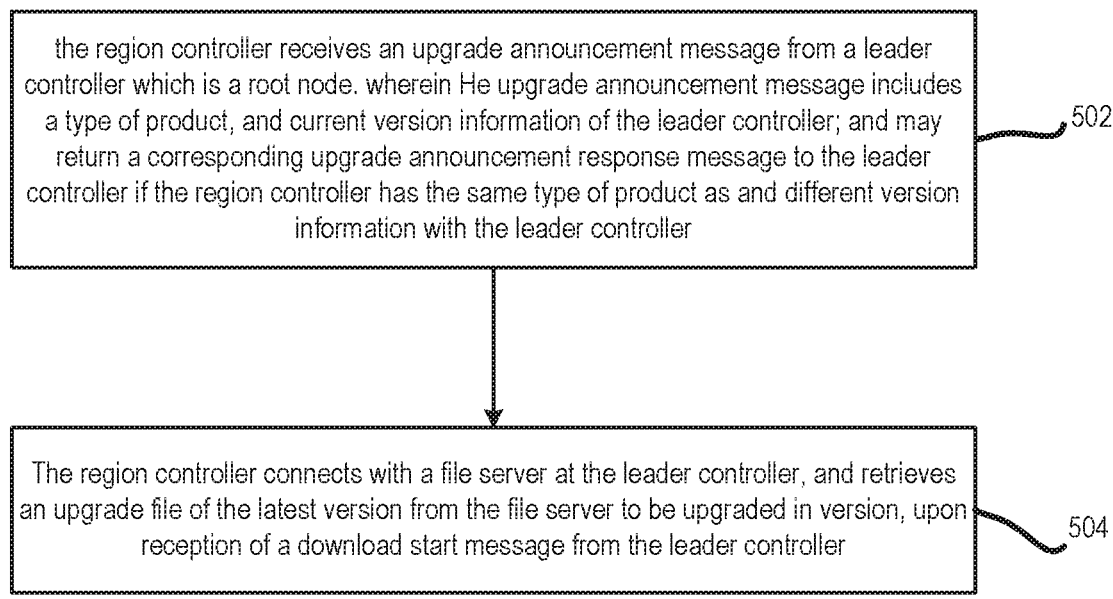
FIG. 5 illustrates a flow chart of another method for upgrading a controller cluster in an example.

The processor 410 of the region controller 40 reads and executes an upgrade logic of the controller cluster in the machine-readable storage medium in an operational flow as illustrated in FIG. 5:

At the block 502, the region controller 40 receives an upgrade announcement message from a leader controller which is a root node. The upgrade announcement message includes a type of product, and current version information of the leader controller 20. The region controller 40 may return a corresponding upgrade announcement response message to the leader controller 20 if the region controller 40 has the same type of product as and different version information with the leader controller 20; and At the block 504, the region controller 40 connects with a file server running at the leader controller, and retrieves an upgrade file of the latest version from the file server to be upgraded in version, upon reception of a download start message from the leader controller.

In this example, the leader controller and the region controllers can be upgraded in version step by step, and the burden on the version server can be shared to the leader controller, that is, the region controller can retrieve the upgrade file directly from the leader controller at the corresponding root node, and thereby: in comparison with upgrading the respective region controllers separately, the upgrading efficiency is improved; and in comparison with upgrading all region controllers at the same time, the stress imposed on the version server is significantly lowered, so as to improve the overall upgrade efficiency of the controller cluster.

The version upgrade operation of the controller cluster 10 will be described below in details with reference to a data exchange process between the leader controller, the region controller, and the version server.

Figure 6:
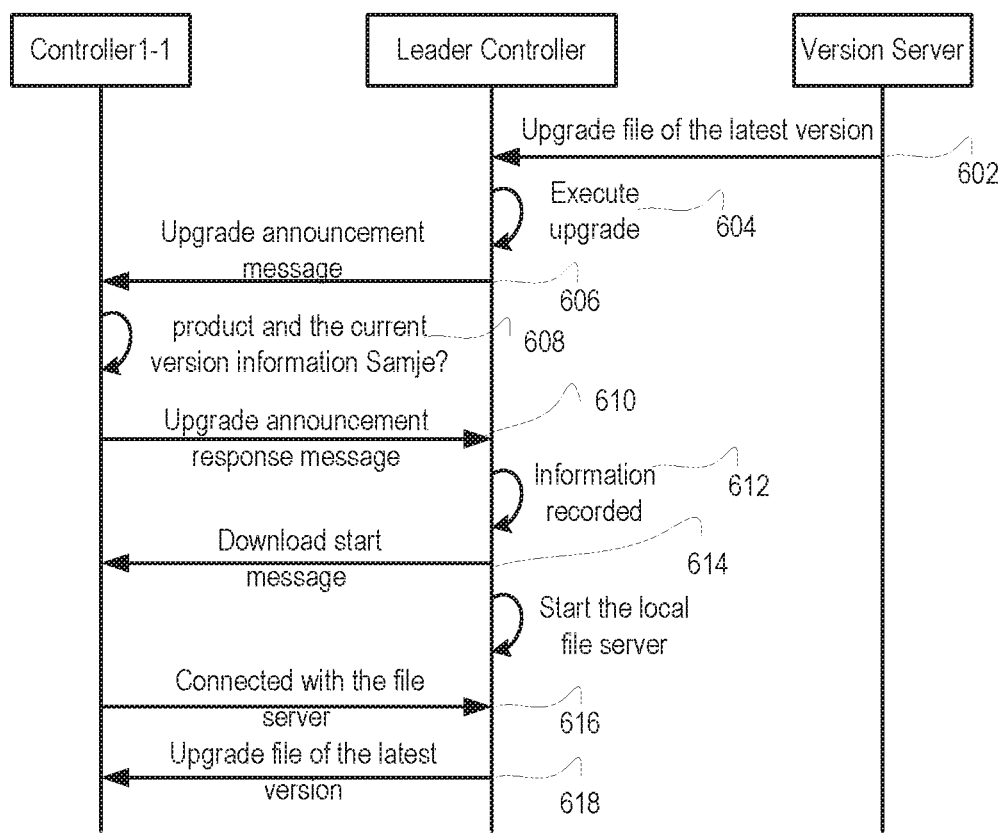
FIG. 6 illustrates a schematic diagram of data exchanging process when a controller cluster being upgraded in an example.

FIG. 6 illustrates a schematic diagram of exchanging data among a controller cluster being upgraded in an example.

At the block 602, if the controller cluster 10 is to be upgraded in version, then the leader controller create connection with the version server to retrieve the upgrade file of the latest version from the version server;

At the block 604, the leader controller 20 is upgraded locally in version using the retrieved upgrade file;

At the block 606, after finishing its own upgrade, the leader controller 20 controls the region controller, which is a corresponding child node, to be upgraded in version. The upgrade announcement message can be sent in a multicast mode and can include the type of product, and the current version information of the leader controller, i.e., the latest version information of the upgraded leader controller;

At the block 608, the region controller 40 determines from the received announcement whether its type of product and current version information are same with the leader controller according to the upgrade announcement message. If the type of product is different with the leader controller 20, the region controller 40 may discard the message. If the type of product is the same, but the current version information is different, it indicates that the region controller is not of the latest version and is to be upgraded in version. If both the type of product and the current version information are same with the leader controller 20, then it indicates that the controller is of the latest version and does not be upgraded;

At the block 610, if the type of product is same with the leader controller 20 and the current version information is different with the leader controller 20, the region controller 40 may respond to the leader controller 20, that is, returns the corresponding upgrade announcement response message to the leader controller, where the message includes the current version information of the region controller 40;

At the block 612, the leader controller 20 parses all the received upgrade announcement response messages, and records the version information therein in association with the corresponding region controllers 40;

At the block 614, the leader controller 20 sends the download start message to the region controllers 40 to control the corresponding region controllers 40 to start to retrieve the upgrade file of the latest version for version upgrade.

In this example, the leader controller 20 can alternatively start the local file server so that the region controller can download the upgrade file from the local server. It should be noted that this disclosure will not be limited to any particular order in which "the sending of the download start message" and "the starting of the local file server" are performed. For example, firstly "the sending of the download start message" and then "the starting of the local file server" can be performed, or firstly "the starting of the local file server" and then "the sending of the download start message" can be performed, or both of the operations can be performed concurrently;

At the block 616, the region controller 40 is connected with the file server at the corresponding leader controller 20 upon reception of the download start message; and At the block 618, the region controller 40 downloads the upgrade file of the latest version for version upgrade from the file server running on the leader controller 20.

All region controllers 40 may try to respectively connect with the file server at the leader controller. There may be a limited number of available connections at the file server. If the number of region controllers building connection is too large, all the region controllers may not be connected concurrently and download the upgrade file. A corresponding file download queue can be further created, so that the region controllers 40 can be connected sequentially with the file server of the leader controller 20 in an order. If all the connections supported by the leader controller 20 have been occupied, then the remaining region controllers will wait in the queue for an available connection.

Figure 7:
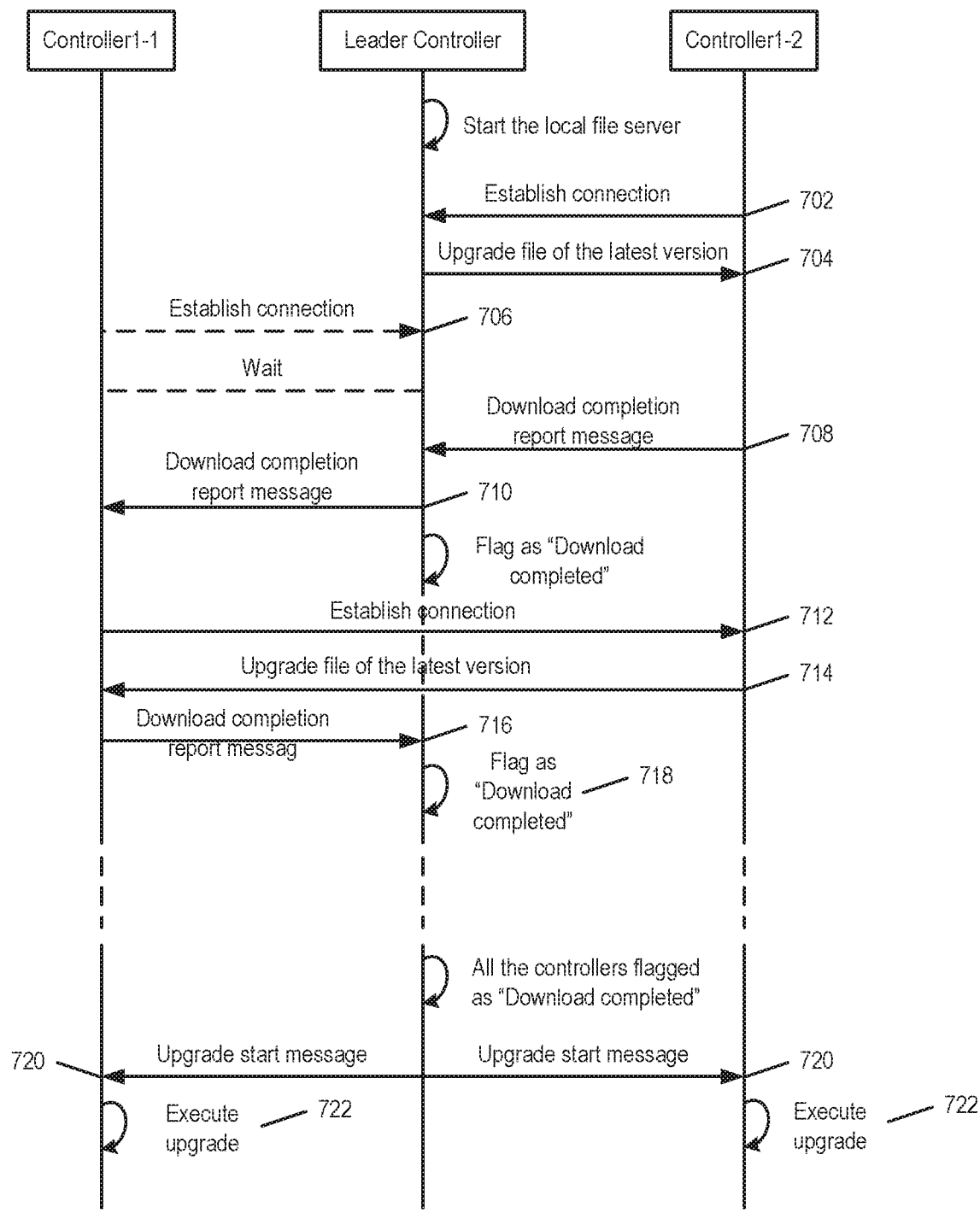
FIG. 7 illustrates another schematic diagram of data exchanging when a controller cluster being upgraded in an example.

Due to the wait mechanism of the queue, the respective region controllers 40 may retrieve the upgrade file with efficiency limited by the number of connections supported by the file server. In order to improve the efficiency of upgrading the controller cluster, an example of this disclosure further illustrates a technical solution as illustrated in FIG. 7, where the technical solution includes:

At the block 702, after the leader controller 20 starts the local file server, the controller 1-2 is connected with the file server in response to the received download start message (providing the controller 1-2 is firstly connected successfully with the file server);

At the block 704, the controller 1-2 downloads the upgrade file of the latest version from the file server of the corresponding leader controller 20 over the established connection;

At the block 706, the controller 1-1 initiates a connection request to the file server of the leader controller 20 in response to the received download start message, and if all existing connections are busy, then the controller 1-1 firstly enters the wait state;

At the block 708, while the controller 1-1 is waiting, the controller 1-2 downloads the upgrade file of the latest version, and sends a download completion report message to the leader controller 20. This message includes address information (e.g., an IP address, a port number, etc.) of the controller 1-2 to indicate that the controller 1-2 has downloaded the upgrade file;

At the block 710, the lead controller 20 sends the received download complete report message to the controller 1-1 waiting for being connected with the file server, and the leader controller 20 flags the controller 1-2 as "Download. Completed";

At the block 712, the controller 1-1 is connected with the controller 1-2 according to the address information in the download completion report message;

At the block 714, the controller 1-1 downloads the upgrade file of the latest version from the controller 1-2;

At the block 716, the controller 1-1 sends a download completion report message to the leader controller after downloading the upgrade file of the latest version from the controller 1-2, where the message includes the address information of the controller 1-1 to indicate that the controller 1-1 has downloaded the upgrade file, and the leader controller 20 can send the download completion report message to other region controllers which are waiting for connecting with the file server. According to such predetermined load sharing policy, these region controllers 40 can be further connected with the controller 1-1 and download the upgrade file from the controller 1-1;

At the block 718, the leader controller 20 flags the controller 1-1 as "Download completed" in response to the received download completion message from the controller 1-1;

At the block 720, if both the controller 1-1 and the controller 1-2, which are child nodes of the leader controller, are flagged as "Download completed". The leader controller 20 sends an upgrade start message to the controller 1-1 and the controller 40; and At the block 722, the controller 1-1 and the controller 1-2 are upgraded in version by using the downloaded upgrade file of the latest version respectively in response to the received upgrade start message.

According this example, in this disclosure, the upgrade file can be downloaded among the region controllers 40, and so the downloading efficiency can be improved as the limit of the number of connections is removed, the upgrading efficiency can be improved as the burden at the file server of the leader controller 20 is decreased.

Figure 8:
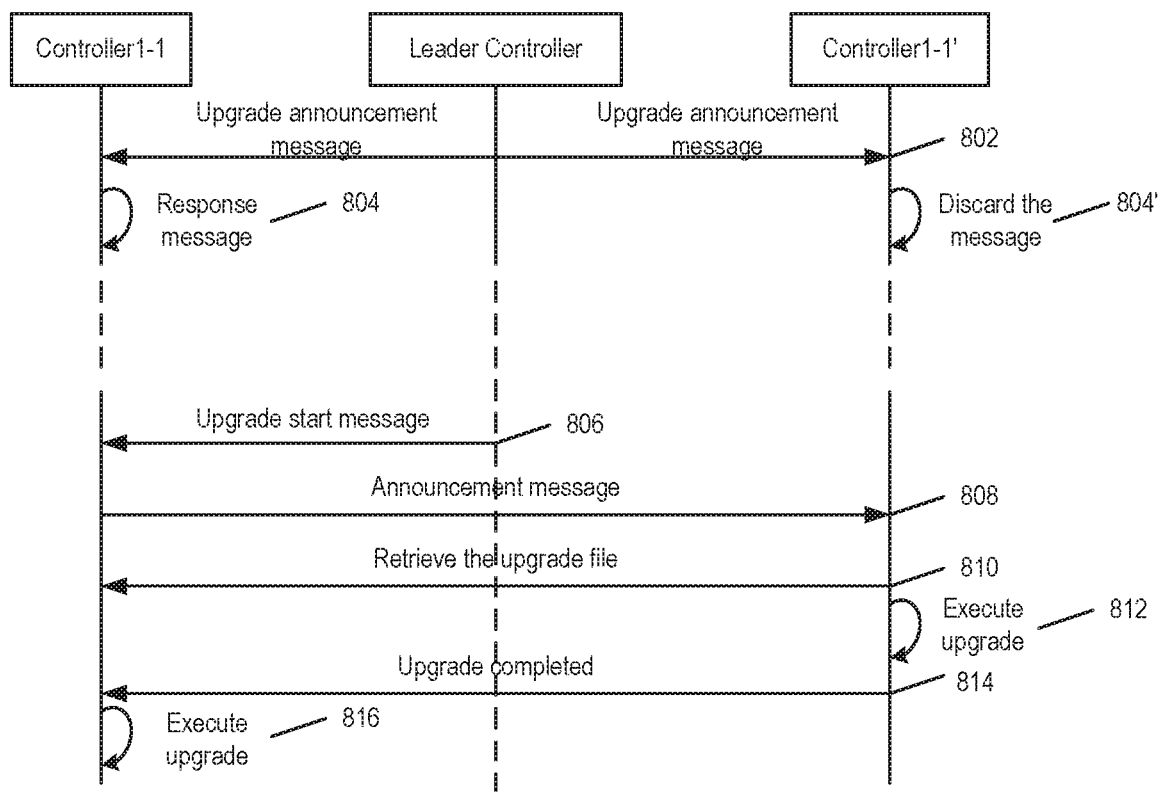
FIG. 8 illustrates another schematic diagram of data exchanging when a controller cluster being upgraded in an example.

If "primary and backup" region controllers are configured in a region, then another example of this disclosure further proposes a technical solution as illustrated in FIG. 8. A backup region controller i.e., a controller 1-1', is configured for the controller 1-1 in the region. The controller 1-1 and the controller 1-1' respectively act as primary and backup region controller. In this example, the leader controller 20 may control the controller 1-1 and the controller 1-1' to be upgraded in version particularly as follows:

At the block 802, the leader controller 20 sends an upgrade announcement message respectively to all the region controllers 40 which are child nodes thereof in the form of multicast, so that the controller 1-1 and the controller 1-1' could receive the multicast message respectively;

At the block 804, the controller 1-1 responds to the received upgrade announcement message in a preconfigured manner particularly as described at the block 606 to the block 618 in FIG. 6;

At the block 806, the controller 1-1' may not respond to the upgrade announcement message from the leader controller, but may discard the message upon reception of the message in a preconfigured manner;

At the block 808, the leader controller 20 sends an upgrade start message to the controller 1-1 based upon the response of the controller 1-1 to the upgrade announcement message;

At the block 810, the controller 1-1 sends an announcement message including the type of product information, and the version information of the upgrade file of the latest version to the controller 1-1' after receiving the upgrade start message sent by the leader controller 20. The controller 1-1' may compare the type of product and the version information in the announcement message with the local type of product and version information upon reception of the announcement message. If the types of products are different, the controller 1-1' will discard the message. If the types of products are the same, but the local current version information is different with the version information in the message, that is, the current version of the controller 1-1' is not the latest version, the controller 1-1' is to be upgraded in version;

At the block 811, the controller 1-1' sends a download request message to the primary controller 1-1 to download the upgrade file of the latest version from the controller 1-1;

At the block 812, if the controller 1-1' downloads the upgrade version of the latest version successfully from the controller 1-1, then the controller 1-1' can be upgraded locally version using the downloaded upgrade file of the latest version;

At the block 814, the upgraded controller 1-1' sends an announcement message to the controller 1-1 to indicate that the current version information has been upgraded; and At the block 816, the controller 1-1 is further upgraded in version by using the upgrade file of the latest version after receiving the upgrade completion announcement message sent by the controller 1-1'; and after both the controller 1-1 and the controller 1-1' have been upgraded, the controller 1-1 reports the upgraded version information of both the controller 1-1 and the controller 1-1' to the leader controller 20 so that the leader controller updates the locally recorded version information.

In another example, the controller 1-1' may also send a download completion report message respectively to the controller 1-1 and the leader controller 20 after successfully downloading the upgrade file of the latest version from the controller 1-1. After successfully downloading the upgrade file of the latest version from the file server of the leader controller, the controller 1-1 may not send the download completion report message immediately to the leader controller 20, but can send the download completion report message to the leader controller 20 upon reception of the download complete report message sent by the controller 1-1'. The leader controller can determine that all the primary and backup region controllers in the region have downloaded the upgrade file of the latest version, upon reception of the download completion report message sent by the controller 1-1. After the downloading process, both the controller 1-1 and the controller 1-1' may wait for the upgrade start message sent by the leader controller 20 to start to be upgraded in version. In this way, the leader controller 20 can upgrade the backup region controllers in batches according to a preset policy or as needed in reality. For example, there may be multiple backup region controllers configured in a region, and in this way the leader controller can upgrade the multiple backup region controllers in the region in batches by controlling the order that they are upgraded.

The primary region controllers and the backup region controllers can be upgraded step by step to ensure the stability of the SDN network during the process of upgrade of the controller cluster. Since firstly the backup region controllers and then the primary region controllers are upgraded, there will be no influence upon services hosted by the primary controllers. The backup region controllers can retrieve the upgrade file from the corresponding primary region controllers to alleviate a stress of data exchange between the version server and the leader controller 20, which could remove the limit for number of connections which can be supported by the file server of the leader controller.

Figure 9:
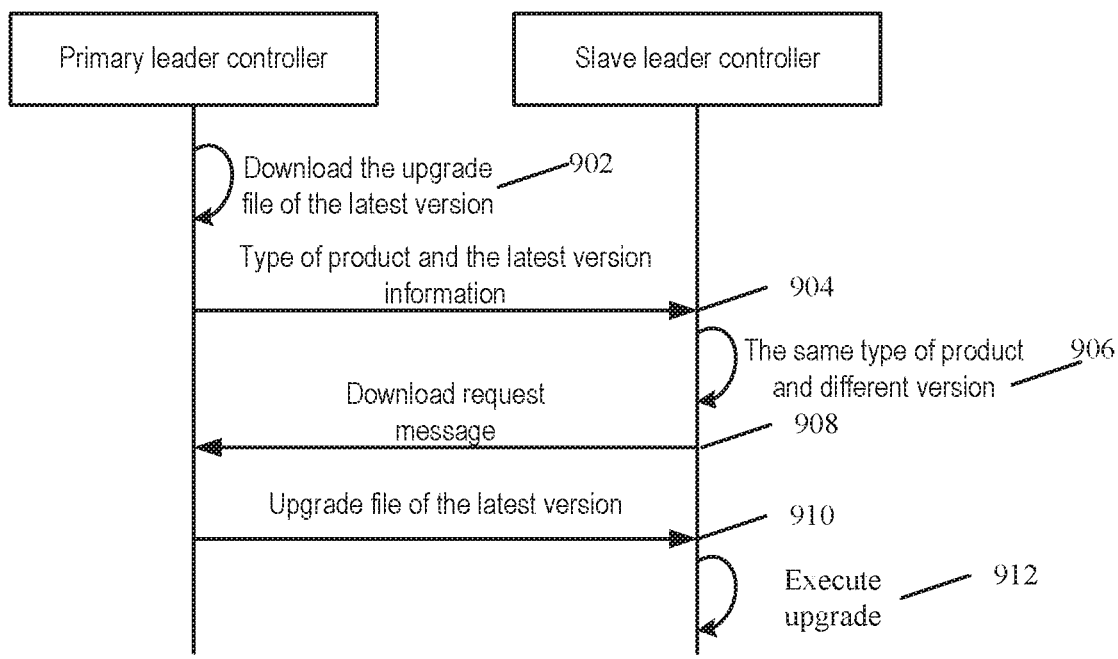
FIG. 9 illustrates another schematic diagram of data exchanging when a controller cluster being upgraded in an example.
Figure 10:
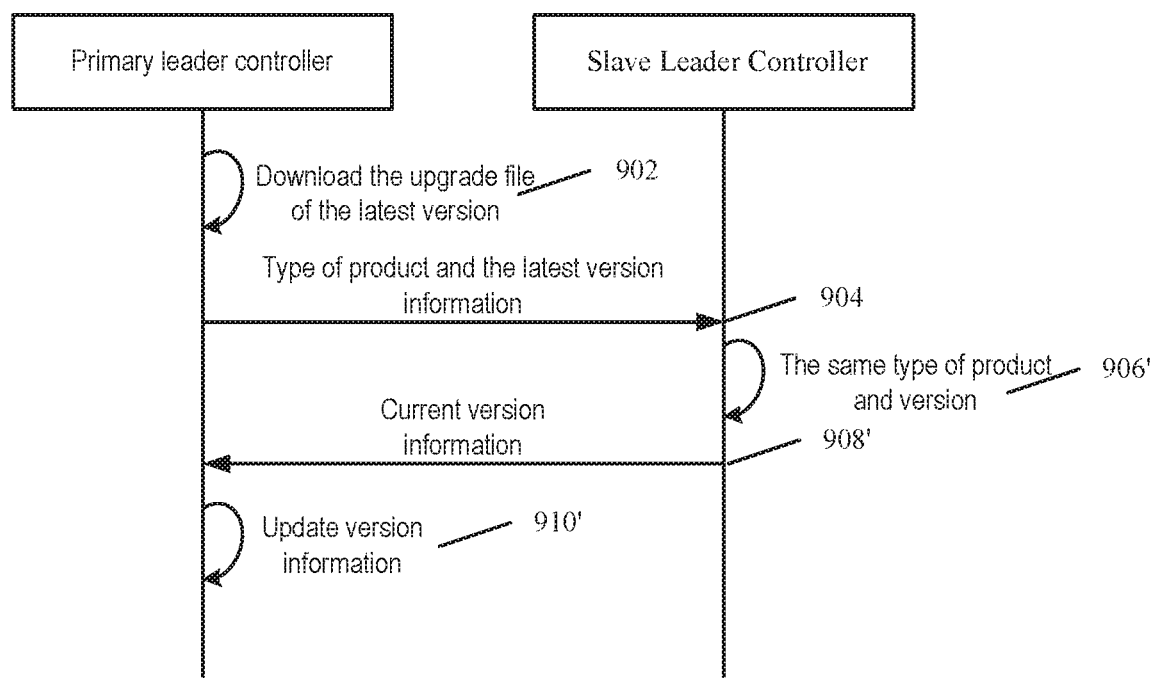
FIG. 10 illustrates another schematic diagram of data exchanging when a controller cluster being upgraded in an example.

In another example, the leader controller 20 may also be used as primary or backup leader controllers. In the SDN controller cluster where there are both a primary leader controller and a backup leader controller, an example of this disclosure further proposes a technical solution as illustrated in FIG. 9 AND FIG. 10, where the technical solution includes:

At the block 902, the primary leader controller downloads the upgrade file of the latest version from the version server;

At the block 904, the primary leader controller sends a message including the type of product information, and the version information of the upgrade file of the latest version to the backup leader controller. The backup leader controller compares it's type of product and version information with the type of product and the version information in the message upon reception of the message;

At the block 906, if the types of product are different, the backup leader controller may discard the message directly; or if the types of products are the same, but the local current version information is different with the version information in the message, that is, the current version of the leader controller is not the latest version, the backup leader controller is to be upgraded in version;

At the block 908, the backup leader controller sends a download request message to the primary leader controller to initiate downloading of the upgrade file of the latest version;

At the block 910, the backup leader controller downloads the upgrade file of the latest version from the primary leader controller; and At the block 912, the backup leader controller is upgraded locally in version by using the downloaded upgrade file. The backup leader controller upgraded in version can notify the primary leader controller of the upgraded version information. Then the primary leader controller executes upgrade by using the upgrade file of the latest version and updates the version information of the backup leader controller.

In another example, the backup leader controller can send a download completion report message to the primary leader controller after downloading the upgrade file of the latest version from the primary leader controller. The primary leader controller can send an upgrade start message to the backup leader controller upon reception of the download completion report message sent by the backup leader controller, and the backup leader controller can be upgraded in version upon reception of the upgrade start message sent by the primary leader controller. In this way, the primary leader controller can upgrade the backup leader controllers in batches according to a preset policy or as needed in reality. For example, a primary leader controller may be configured with multiple backup leader controllers, and in this way, the primary leader controller can upgrade the multiple backup leader controllers in the region in batches by controlling the order that they are upgraded.

As illustrated in FIG. 10, a process flow subsequent to the block 904 may further include:

At the block 906', the backup leader controller detects that both the local type of product and version same with the received message, that is, the version of the backup leader controller is the latest version, and will not be upgrade in version;

At the block 908', the backup leader controller sends a message including its current version information to the primary leader controller; and At the block 910', the primary leader controller updates the locally recorded version information of the backup leader controller.

In above example, primary and backup leader controllers structure is used. Since firstly the backup region leader controller and then the primary leader controller are upgraded, there will be no influence upon a network service hosted by the primary leader controller. The primary leader controller and the backup leader controller can be upgraded step by step to alleviate the stress on the version server and improve the efficiency of upgrading in version the controller cluster.

The invention claimed is:

1. A method for upgrading controllers of a controller cluster, comprising:
   downloading, by a leader controller, an upgrade file of a latest version from a version server and upgrading the leader controller using the upgrade file;
   sending an upgrade announcement to a region controller, wherein the upgrade announcement comprises information including a type of product of the leader controller, and a current version of the leader controller;
   receiving, from the region controller, an upgrade announcement response comprising information including a type of product of the region controller and a current version of the region controller;
   determining that the type of product of the region controller is the same as the type of product of the leader controller and the current version of the region controller is different than the current version of the leader controller; and
   recording the upgrade announcement response, sending a download start message to the region controller, and starting a local file server on the leader controller to transmit the upgrade file of the latest version to the region controller.

2. The method according to claim 1, further comprising:
   receiving a download completion report from the region controller, wherein the report comprises address information of the region controller and indicates that the region controller has downloaded the upgrade file of the latest version; and
   sending the received download completion report to another region controller waiting to download the upgrade file of the latest version from a local file server on the region controller.

3. The method according to claim 2, further comprising:
   flagging the region controller as Download Completed upon receiving the download completion report at the leader controller; and
   once all region controllers of the controller cluster are flagged as Download Completed, transmit, from the leader controller, an upgrade start message to the region controllers of the controller cluster.

4. The method according to claim 1, wherein the controller cluster comprises a primary leader controller and a backup leader controller, and wherein:
   the primary leader controller downloads the upgrade file of the latest version from the version server; and
   the primary leader controller upgrades the backup leader controller, comprising:
      sending a message comprising type of product, and version information of the upgrade file of the latest version to the backup leader controller,
      when the backup leader controller returns a download request message, sending the upgrade file of the latest version to the backup leader controller; and
      when the backup leader controller returns a message comprising current version information of the backup leader controller, updating locally recorded version information of the backup leader controller, and upgrading the backup leader controller using the upgrade file of the latest version.

5. The method according to claim 4, further comprising:
   receiving, at the backup leader controller, a message comprising a type of product of the upgrade file of the latest version, and version information of the upgrade file of the latest version from the primary leader controller;
   when the type of product and the version information of the received message match the type of product and current version of the backup leader controller, transmitting a message comprising the current version to the primary leader controller; and
   when the type of product of the received message matches the type of product of the backup leader controller and the version information of the received message does not match the current version of the backup leader controller, transmitting a download request message to the primary leader controller, downloading the upgrade file of the latest version from the primary leader controller, upgrading the backup leader controller using the upgrade file of the latest version, and returning a message comprising the current version information of the backup leader controller to the primary leader controller.

6. The method according to claim 3, wherein the region controllers comprise a primary region controller and a backup region controller, and further comprising:
   receive, at the primary region controller, an upgrade start message from the leader controller;
   transmit an announcement to the backup region controller to cause the backup region controller to download the upgrade file of the latest version from the primary region controller; and
   once the backup region controller has been upgraded, upgrade the primary region controller using the upgrade file of the latest version.

7. A controller comprising a processor and a non-transitory, machine readable storage medium storing instructions executable by the processor to:
   download an upgrade file of a latest version from a version server;
   upgrade using the upgrade file;
   send an upgrade announcement message to region controllers of the controller cluster comprising a type of product of the leader controller, and current version information of the leader controller;

receive, from the region controllers, upgrade announcement response messages including a type of product of the each region controller and a current version of the each region controller;

determine that the upgrade announcement response messages have the same type of product and different current version information as compared to the upgrade announcement;

record information from the upgrade announcement response messages relating to each corresponding region controller;

send a download start message to the region controllers; and start a local file server to transmit the upgrade file of the latest version to the region controllers.

8. The controller according to claim 7, wherein the instructions are executed by the processor further to:

receive download completion report messages from the region controllers, wherein each message comprises address information of the respective region controller to indicate that the region controller has downloaded the upgrade file of the latest version; and send one of the received download completion report messages to another region controller waiting to connect to the file server, indicating to the another region controller to connect to a region controller referenced in the one of the received download completion report messages.

9. The controller according to claim 8, wherein the instructions are executed by the processor further to:

flag the region controller references in the one of the received download completion report messages as Download Completed upon receiving the download completion report message; and once every region controller of the region controllers is flagged as Download Completed, send an upgrade start message to the region controllers.

10. The controller according to claim 7, wherein the controller cluster comprises a primary leader controller and a backup leader controller; wherein the instructions are executed by the processor further to:

download the upgrade file of the latest version from the version server;

upgrade the backup leader controller, comprising:

sending a message comprising the type of product, and the version information of the upgrade file of the latest version to the backup leader controller;

when a download request message is received from the backup leader controller, sending the upgrade file of the latest version to the backup leader controller; and when a message comprising current version information of the backup leader controller is received from the backup leader controller, updating locally recorded version information relating to the backup leader controller, and upgrading using the upgrade file of the latest version.

11. The controller according to claim 10, wherein the instructions are further to:

receive a message comprising a type of product, and version information of the upgrade file of the latest version from the primary leader controller;

wherein if both a type of product and current version information of the backup leader controller is the same as the type of product and the version information in the message, the backup leader controller returns when the type of product and the version information of the received message match the type of product and current version of the backup leader controller, transmitting a message comprising the current version information of the backup leader controller present device to the primary leader controller;

if the type of product of the present device is the same as the type of product in the message, and the current version information is different from the version information in the message, the backup leader controller returns when the type of product of the received message matches the type of product of the backup leader controller and the version information of the received message does not match the current version of the backup leader controller, transmitting a download request message to the primary leader controller, downloads downloading the upgrade file of the latest version from the primary leader controller, upgrading upgrades the present device backup leader controller using the upgrade file of the latest version, and then returns transmitting a message comprising the current version information of the present device backup leader controller to the primary leader controller.

12. The controller according to claim 9, wherein the region controllers comprise a primary region controller and a backup region controller, and wherein the instructions are executed by the processor further to:

transmit an announcement to cause the backup region controller to download the upgrade file of the latest version from the primary region controller once the primary region controller receives an upgrade start message from the leader controller;

upgrade using the upgrade file of the latest version after the backup region controller has upgraded; and discard the upgrade announcement message from the leader controller if the current controller be used as a backup region controller.

\* \* \* \* \*